US012774200B2

(12) United States Patent
Derval

(10) Patent No.: US 12,774,200 B2
(45) Date of Patent: Oct. 27, 2026

(54) HANDLING MACHINE COMPRISING A LIFTING ARM PROVIDED WITH AN ARTICULATED TOOL, AND METHOD FOR CONTROLLING SUCH A HANDLING MACHINE

(71) Applicant: MANITOU BF, Ancenis (FR)

(72) Inventor: Laurent Derval, Ancenis (FR)

(73) Assignee: MANITOU BF, Ancenis (FR)

(*) Notice: Subject to any disclaimer, the term of this patent is extended or adjusted under 35 U.S.C. 154(b) by 315 days.

(21) Appl. No.: 18/722,443

(22) PCT Filed: Oct. 21, 2022

(86) PCT No.: PCT/EP2022/079473
§ 371 (c)(1),
(2) Date: Jun. 20, 2024

(87) PCT Pub. No.: WO2023/117177
PCT Pub. Date: Jun. 29, 2023

(65) Prior Publication Data

US 2024/0417226 A1 Dec. 19, 2024

(30) Foreign Application Priority Data

Dec. 20, 2021 (FR) ....................................... 2113947

(51) Int. Cl.
*B66F 9/075* (2006.01)
*B66F 9/065* (2006.01)

(52) U.S. Cl.
CPC .......... *B66F 9/0755* (2013.01); *B66F 9/0655* (2013.01); *G05B 2219/2641* (2013.01); *G05B 2219/41181* (2013.01)

(58) Field of Classification Search
CPC ........ B66F 9/0755; B66F 9/0655; B66F 9/22; G05B 2219/2641; G05B 2219/41181
See application file for complete search history.

(56) References Cited

U.S. PATENT DOCUMENTS

2015/0275469 A1* 10/2015 Fredrickson ............ E02F 9/265 701/50
2019/0078288 A1* 3/2019 Wu ....................... E02F 3/3405
(Continued)

FOREIGN PATENT DOCUMENTS

EP 3702312 A1 9/2020
WO 2020229291 A1 11/2020
WO 2021170929 A1 9/2021

OTHER PUBLICATIONS

International Search Report and Written Opinion for International Patent Application No. PCT/EP2022/079473, mailed Feb. 1, 2023, 17 pages.

*Primary Examiner* — Rami R Okasha
(74) *Attorney, Agent, or Firm* — Husch Blackwell LLP

(57) ABSTRACT

A method for controlling a handling machine is provided. The handling machine includes a chassis, a lifting arm mounted pivotingly, a lifting ram arranged to pivot the lifting arm, a first sensor configured to deliver a position measurement signal relating to a position of the lifting arm, a tool mounted pivotingly on the lifting arm, a tilt ram arranged to pivot the tool, and a second sensor to deliver a travel measurement signal relating to a travel of the tilt ram. The method includes receiving a tilt request to actuate the tilt ram, and responsive to receipt of a lift request to actuate the lifting ram, activating a compensation mode, the compensation mode including generating a setpoint relating to the travel based on the position measurement signal and providing closed-loop control of the travel based on the setpoint and the travel measurement signal.

20 Claims, 2 Drawing Sheets

(56) References Cited

U.S. PATENT DOCUMENTS

| | | | | |
|---|---|---|---|---|
| 2021/0317638 | A1* | 10/2021 | Westergaard | E02F 3/3411 |
| 2022/0297987 | A1* | 9/2022 | Tang | B66C 13/20 |

* cited by examiner

HANDLING MACHINE COMPRISING A LIFTING ARM PROVIDED WITH AN ARTICULATED TOOL, AND METHOD FOR CONTROLLING SUCH A HANDLING MACHINE

TECHNICAL FIELD

The disclosure relates to the field of handling machines comprising a lifting arm.

The disclosure relates more specifically to a handling machine comprising a lifting arm mounted pivotingly on the chassis of the handling machine and a tool, such as a bucket or a fork for example, that is articulated on the lifting arm.

Background

Document WO2021170929 discloses a handling machine comprising a lifting arm that is mounted pivotingly on the chassis about a horizontal axis. The handling machine further comprises a tool intended to receive a load, such as a bucket or a fork, which may be articulated on the lifting arm. The handling machine comprises a lifting ram that is coupled on one side to the chassis and on the other side to the lifting arm, thereby enabling the lifting arm to be pivoted about the pivot axis thereof. A hydraulic tilt ram is disposed between the lifting arm and the tool and enables the tool to be moved in relation to the lifting arm. The tilt ram is in fluidic communication with a compensation ram, which is actuated as a function of the displacement of the lifting arm in relation to the chassis. The compensation ram and the tilt ram operate respectively as master and slave to keep the accessory horizontal when the lifting arm is being raised.

Such a handling machine is not entirely satisfactory. This is because the compensation ram is heavy and bulky, and assembly thereof complicates manufacturing of the machine. Furthermore, the compensation ram generates mechanical stresses on the lifting arm and on the chassis.

SUMMARY

One idea at the heart of the disclosure is to propose a handling machine of the aforementioned type, i.e. comprising a lifting arm mounted pivotingly on the chassis of the handling machine and a tool articulated on the lifting arm, provided with compensation means enabling the inclination of the tool in relation to the chassis to be kept constant or substantially constant as the lifting arm is being raised, and that are simpler, more lightweight and less bulky.

One idea at the heart of the disclosure involves proposing such a handling machine that has no compensation ram to control the tilt ram moving the tool in relation to the lifting arm.

One idea at the heart of the disclosure also involves proposing a method for controlling such a handling machine.

According to a first aspect, the disclosure proposes a method for controlling a handling machine comprising a chassis, a lifting arm mounted pivotingly on the chassis about at least one axis X1 between a lowered position and a raised position, a lifting ram arranged to pivot the lifting arm about said axis X1 between the lowered position and the raised position, a first sensor that is configured to deliver a measurement signal S1 representing a position of the lifting arm between the lowered position and the raised position, a tool intended to receive a load and mounted pivotingly on the lifting arm about at least one axis X4 parallel to X1, a tilt ram that has a travel Lincl and is arranged to pivot the tool about said axis X4, a second sensor that is configured to deliver a measurement signal S2 relating to the travel Lincl of the tilt ram, at least one actuator that is configured to deliver requests Dlev to actuate the lifting ram and requests Dincl to actuate the tilt ram, the method including the following steps:

- receiving a request Dincl to actuate the tilt ram,
- in response to receipt of a request Dincl to actuate the tilt ram, activating a manual actuation mode of the tilt ram, said manual actuation mode of the tilt ram comprising generating a setpoint Lc relating to the travel of the tilt ram as a function of said request Dincl to actuate the tilt ram and providing closed-loop control of the travel Lincl of the tilt ram as a function of said setpoint Lc relating to the travel of the tilt ram and of the measurement signal S2 relating to the travel Lincl of the tilt ram,
- receiving a request Dlev to actuate the lifting ram, and
- in response to receipt of a request to actuate the lifting ram, activating a compensation mode, the compensation mode including the steps of generating a setpoint Lc relating to the travel of the tilt ram as a function of a variation in the measurement signal S1 representing the position Plev of the lifting arm over time and providing closed-loop control of the travel Lincl of the tilt ram as a function of said setpoint Lc relating to the travel of the tilt ram and of the measurement signal S2 relating to the travel Lincl of the tilt ram.

Thus, such a method makes it possible to electronically control the tilt ram so as to compensate for the up or down movement of the lifting arm without using a compensation ram, which is bulky, heavy and liable to generate mechanical stresses on the lifting arm and on the chassis.

According to some embodiments, such a handling machine may exhibit one or more of the following features.

According to one embodiment, in response to receipt of a request to actuate the lifting ram, the method generates a displacement setpoint of the lifting ram as a function of the request $D_{lev}$ and controls the lifting ram as a function of the setpoint thus generated.

According to one embodiment, the tool is a bucket or a fork.

According to one embodiment, the compensation mode involves, for each successive period T, determining an angular variation $\Delta\alpha$ corresponding to the angular displacement of the lifting arm about the axis X1 during the period T, as a function of two measurement signals S1 relating to the position $P_{lev}$ of the lifting arm that are delivered respectively at the beginning and at the end of the period T, and, during the following period, the setpoint $L_c$ relating to the travel of the tilt ram is generated as a function of the angular variation $\Delta\alpha$ corresponding to the preceding period and the travel $L_{incl}$ of the tilt ram is closed-loop controlled as a function of said setpoint $L_c$.

According to one embodiment, the measurement signal S1 delivered by the first sensor relates to a tilt angle $\alpha$ of the lifting arm in relation to a reference axis in a plane orthogonal to the axis X1.

According to one embodiment, the control method includes attributing each new generated setpoint $L_c$ relating to the travel of the tilt ram to a variable $L_0$ and, in compensation mode, the setpoint $L_c$ relating to the travel of the tilt ram is generated as a function of the angular variation $\Delta\alpha$ and of $L_0$. This eliminates or at least limits the cumulative errors related to closed-loop control of the length of the tilt ram.

According to one embodiment, in compensation mode, the setpoint $L_c$ relating to the travel of the tilt ram is generated as a function of the angular variation $\Delta\alpha$ and of $L_0$ so that an angular variation $\Delta\beta$ corresponding to the angular displacement of the tool about the axis X4 for a change in the travel of the ram between $L_0$ and Lc has the same value as and the opposite sign to the angular variation $\Delta\alpha$.

According to one embodiment, the travel $L_{incl}$ of the tilt ram is closed-loop controlled by a PID controller.

According to one embodiment, the compensation mode is deactivated in response to receipt of a request $D_{incl}$ to actuate the tilt ram.

According to one embodiment, the measurement signal S2 relating to the travel $L_{incl}$ of the tilt ram is compared to a threshold length $L_{min}$ and to a threshold length $L_{max}$ corresponding respectively to a fully retracted position and to a fully deployed position of the tilt ram, and the compensation mode is deactivated if the travel $L_{incl}$ of the tilt ram is equal to one of the threshold lengths $L_{min}$ and $L_{max}$.

According to one embodiment, a warning signal is generated if the compensation mode is deactivated.

According to one embodiment, in compensation mode, the measurement signal S2 relating to the travel $L_{incl}$ of the tilt ram is compared to a first threshold value $L_1$ and to a second threshold value $L_2$, the first threshold value $L_1$ being greater than a threshold length $L_{min}$ corresponding to a fully retracted position of the tilt ram, the second threshold value $L_2$ being greater than the first threshold value $L_1$ and less than a threshold length $L_{max}$ corresponding to a fully deployed position of the tilt ram, and the angular pivot speed of the lifting arm about the axis X4 is limited if the travel $L_{incl}$ of the tilt ram is less than the first threshold value $L_1$ or greater than the second threshold value $L_2$.

According to a second aspect, the disclosure also proposes a handling machine comprising a chassis, a lifting arm mounted pivotingly on the chassis about at least one axis X1 between a lowered position and a raised position, a lifting ram arranged to pivot the lifting arm about said axis X1 between the lowered position and the raised position, a first sensor that is configured to deliver a measurement signal S1 representing a position of the lifting arm between the lowered position and the raised position, a tool intended to receive a load and mounted pivotingly on the lifting arm about at least one axis X4 parallel to X1, a tilt ram that has a travel Lincl and is arranged to pivot the tool about said axis X4, a second sensor that is configured to deliver a measurement signal S2 relating to the travel Lincl of the tilt ram, at least one actuator that is configured to deliver requests Dlev to actuate the lifting ram and requests Dincl to actuate the tilt ram, and

- a control unit that is configured to:
- receive the measurement signals S1 and S2, the requests Dlev and the requests Dincl,
- in response to receipt of a request Dincl to actuate the tilt ram, activate a manual actuation mode of the tilt ram, said manual actuation mode of the tilt ram comprising generating a setpoint Lc relating to the travel of the tilt ram as a function of said request Dincl to actuate the tilt ram and providing closed-loop control of the travel Lincl of the tilt ram as a function of said setpoint Lc relating to the travel of the tilt ram and of the measurement signal S2 relating to the travel Lincl of the tilt ram, and
- in response to receipt of a request Dlev to actuate the lifting ram, activate a compensation mode, the compensation mode including the steps of generating a setpoint Lc relating to the travel of the tilt ram as a function of a variation in the measurement signal S1 representing the position of the lifting arm and providing closed-loop control of the travel Lincl of the tilt ram as a function of said setpoint Lc relating to the travel of the tilt ram and of the measurement signal S2 relating to the travel Lincl of the tilt ram.

According to one embodiment, the handling machine includes a hydraulic control circuit that is configured to control the lifting ram and the tilt ram, and the control unit is configured to control the hydraulic control circuit.

According to one embodiment, the hydraulic control circuit includes a tank, a pump and a flow distributor that is configured to bring the hydraulic fluid from the pump into communication selectively with the lifting ram and/or the tilt ram.

According to one embodiment, the control unit is configured such that, in compensation mode:

- for each successive period T, determine an angular variation $\Delta\alpha$ corresponding to the angular displacement of the lifting arm about the axis X1 during the period T, as a function of two measurement signals S1 relating to the position $P_{lev}$ of the lifting arm that are delivered respectively at the beginning and at the end of the period T, and
- during the following period, generate the setpoint $L_c$ relating to the travel of the tilt ram as a function of the angular variation $\Delta\alpha$ corresponding to the preceding period and controlling the travel $L_{incl}$ of the tilt ram as a function of said setpoint $L_c$.

According to one embodiment, the control unit is configured to:

- attribute each new generated setpoint $L_c$ relating to the travel of the tilt ram to a variable $L_0$ and to
- in compensation mode, generate the setpoint $L_c$ relating to the travel of the tilt ram as a function of the angular variation $\Delta\alpha$ and of $L_0$.

BRIEF DESCRIPTION OF THE DRAWINGS

The disclosure will be better understood, and further objects, details, features and advantages thereof will become more clearly apparent, through the following description of a number of particular embodiments of the disclosure, these being given solely by way of nonlimiting illustration, and with reference to the attached drawings.

DESCRIPTION

By convention, the “longitudinal” direction of the handling machine corresponds to the front-rear orientation of the equipment. Furthermore, the “transverse” direction is oriented perpendicular to the longitudinal direction. Moreover, the “vertical” and “horizontal” directions are defined with reference to a handling machine positioned on a perfectly horizontal plane.

Figure 1:
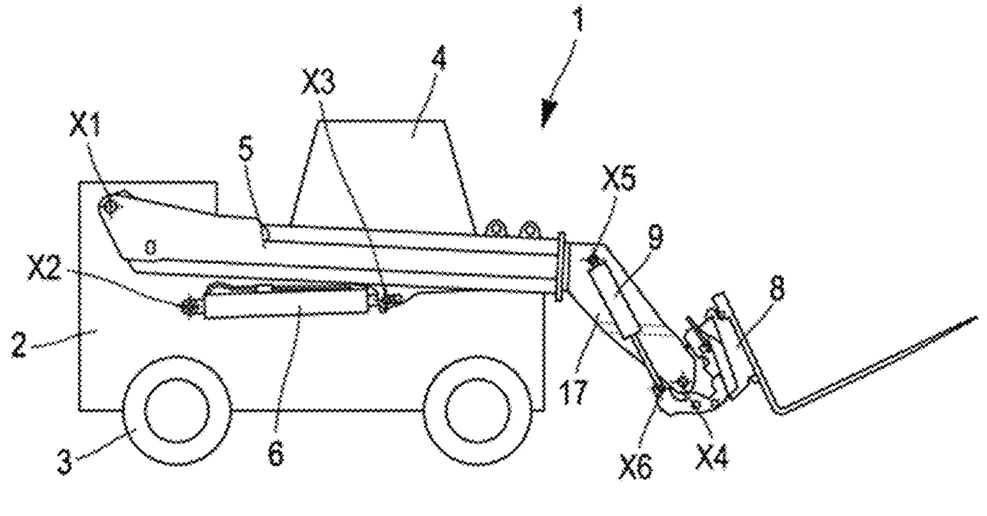
FIG. 1 is a schematic view of a handling machine in the form of a power lift truck.

A handling machine 1 is described below with reference to FIG. 1. The handling machine 1 includes a chassis 2 that is mobile. For this purpose, the handling machine 1 has wheels 3 or tracks, as well as a power train (not shown). The power train comprises an electric or thermal motor as well as a transmission device that couples said motor to the wheels 3 or to the tracks, thereby enabling the handling machine 1 to move.

The handling machine 1 also includes a driving cab 4 that is carried on the chassis 2. The driving cab 4 is provided with a driving position comprising a seat on which the driver can sit to drive the power lift truck. The driving position also includes equipment for controlling the handling machine 1, such as a steering wheel, an accelerator pedal, and a brake pedal. The driving position is also provided with one or more actuators for controlling the displacement of a lifting arm 5 and of a tool 8 articulated thereto, which are described in greater detail below.

The lifting arm 5 is mounted pivotingly on the chassis 2 about an axis X1, which is preferably oriented horizontally and transversely. The lifting arm 5 is therefore mounted moveably in a vertical plane parallel to the longitudinal direction of the handling machine 1 between a lowered position, shown in FIG. 1, and a raised position.

According to one embodiment, the lifting arm 5 is telescopic, i.e. of variable length. For this purpose, the lifting arm 5 has at least two parts, one of which slides inside the other, and a telescoping ram (not shown) that has a first end and a second end fastened respectively to the first part and the second part of the lifting arm 5. In this case, the handling machine 1 may notably be a telescopic handler. According to another embodiment, the lifting arm 5 is an arm of fixed length.

The handling machine 1 also includes a lifting ram 6 that has a first end that is articulated on the chassis 2 of the handling machine 1 about a pivot axis X2 parallel to the axis X1, and a second end that is articulated on the lifting arm 5 about a pivot axis X3 that is also parallel to X1.

Figure 2:
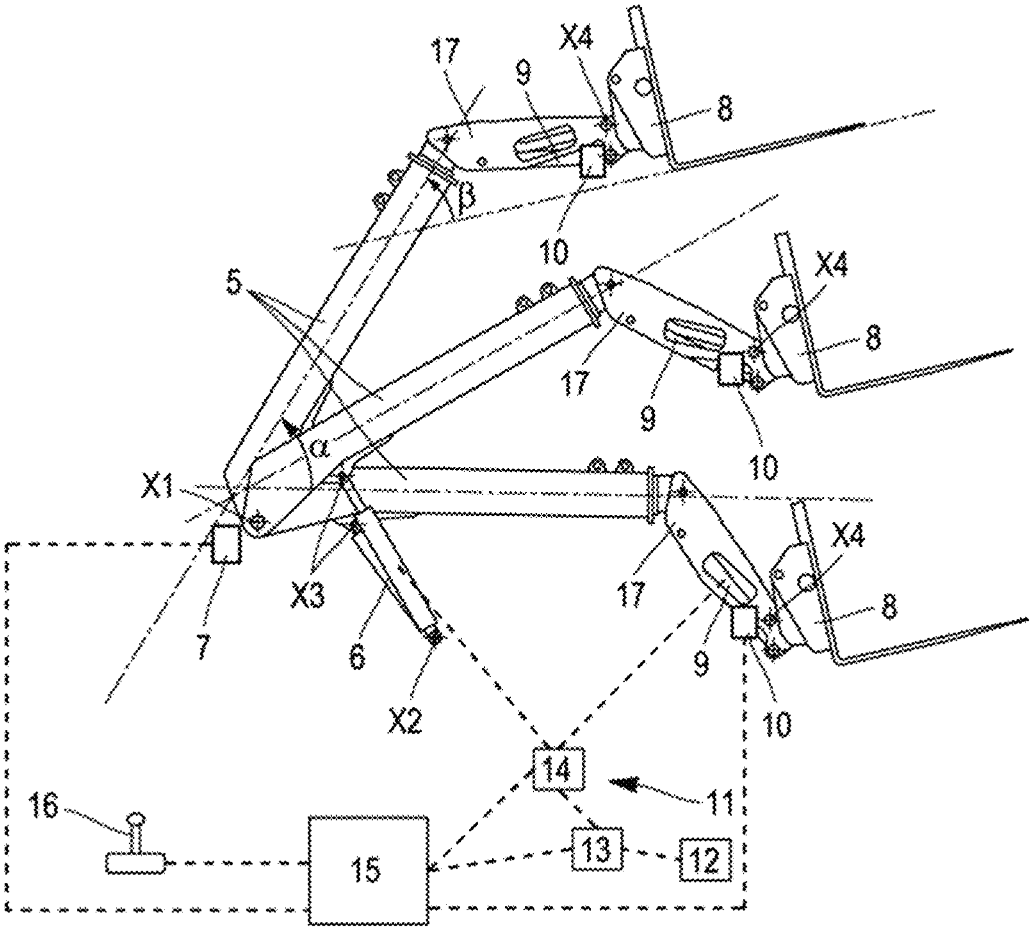
FIG. 2 is a schematic view of the lifting arm as well as of the hydraulic control circuit, the control unit and the actuator of the lifting arm, said lifting arm being shown in three different positions.

Therefore and as shown in FIG. 2, the lifting ram 6 makes it possible to vary the angle α formed, in the plane of displacement of the lifting arm 5, between the longitudinal axis of the lifting arm 5 and a reference axis. Furthermore, the handling machine 1 includes a sensor 7 that is configured to deliver a measurement signal S1 representing the position $P_{lev}$ of the lifting arm 5 between the lowered position and the raised position. According to one embodiment, such a sensor 7 is a Hall-effect angle sensor. According to another embodiment, the sensor 7 is a travel sensor and the measurement signal S1 delivered by the sensor 7 relates to the travel $L_{lev}$ of the lifting ram 6.

Furthermore, the lifting arm 5 is also provided with a tool 8, such as a bucket or a fork, that is intended to receive a load. The tool 8 is articulated on the distal end of the lifting arm 5. The tool 8 is mounted pivotingly in relation to the lifting arm 5 about at least one pivot axis X4 parallel to X1. In the embodiment shown, the distal end of the lifting arm 5 includes an elbow-shaped portion 17 so that the pivot axis X4 of the tool 8 is located beneath the longitudinal axis of the lifting arm 5. This elbow-shaped portion 17 notably enables the tool 8 to be positioned on the ground even if the longitudinal axis of the lifting arm 5 is positioned away from the ground when said lifting arm 5 is in the lowered position.

The handling machine 1 also includes a tilt ram 9 that is configured to pivot the tool 8 about the pivot axis X4. To do so, in the embodiment shown, the tilt ram 9 has a first end articulated on the lifting arm 5 about an axis X5 parallel to X1 and a second end articulated on the tool 8 about an axis X6 also parallel to X1. The tilt ram 9 thus makes it possible to vary the angle β formed between the longitudinal axis of the lifting arm 5 and a reference axis of the tool 8. The tilt ram 9 is provided with a sensor 10 that is configured to deliver a measurement signal S2 relating to the travel $L_{incl}$ of the tilt ram 9.

As shown in FIG. 2, the handling machine 1 includes a hydraulic control circuit 11 that is configured to control the lifting ram 6 and the tilt ram 9. The hydraulic control circuit 11 notably includes a tank 12, a pump 13, and a flow distributor 14. The flow distributor 14 is configured to bring the hydraulic fluid from the pump 13 into communication with the lifting ram 6, with the tilt ram 9, or simultaneously with the lifting ram 6 and the tilt ram 9.

Furthermore, the handling machine 1 includes a control unit 15 that is configured to control the hydraulic control circuit 11 and therefore to control, on the one hand, the lifting ram 6 to move the lifting arm 5 in relation to the chassis 2 of the handling machine 1 and, on the other hand, the tilt ram 9 to move the tool 8 in relation to the lifting arm 5.

The handling machine 1 also includes at least one actuator 16 that can be actuated by an operator, is connected to the control unit 15, and is configured to deliver requests $D_{lev}$ to actuate the lifting ram 6 and requests $D_{incl}$ to actuate the tilt ram 9 to the control unit 15. In the embodiment shown, the handling machine 1 has just one actuator 16 that is configured to deliver both requests $D_{lev}$ to actuate the lifting ram 6 and requests $D_{incl}$ to actuate the tilt ram 9. The actuator is for example a two-axis joystick, in which one of the axes is for controlling the lifting ram 6 and the other is for controlling the tilt ram 9. According to another embodiment, the handling machine 1 includes two actuators that are respectively used to control the lifting ram 6 and to control the tilt ram 9.

Furthermore, the sensors 7, 10 are also connected to the control unit 15 to provide said control unit with the measurement signal S1 representing the position $P_{lev}$ of the lifting arm 5 between the lowered position and the raised position, and the measurement signal S2 relating to the travel $L_{incl}$ of the tilt ram 9.

Figure 3:
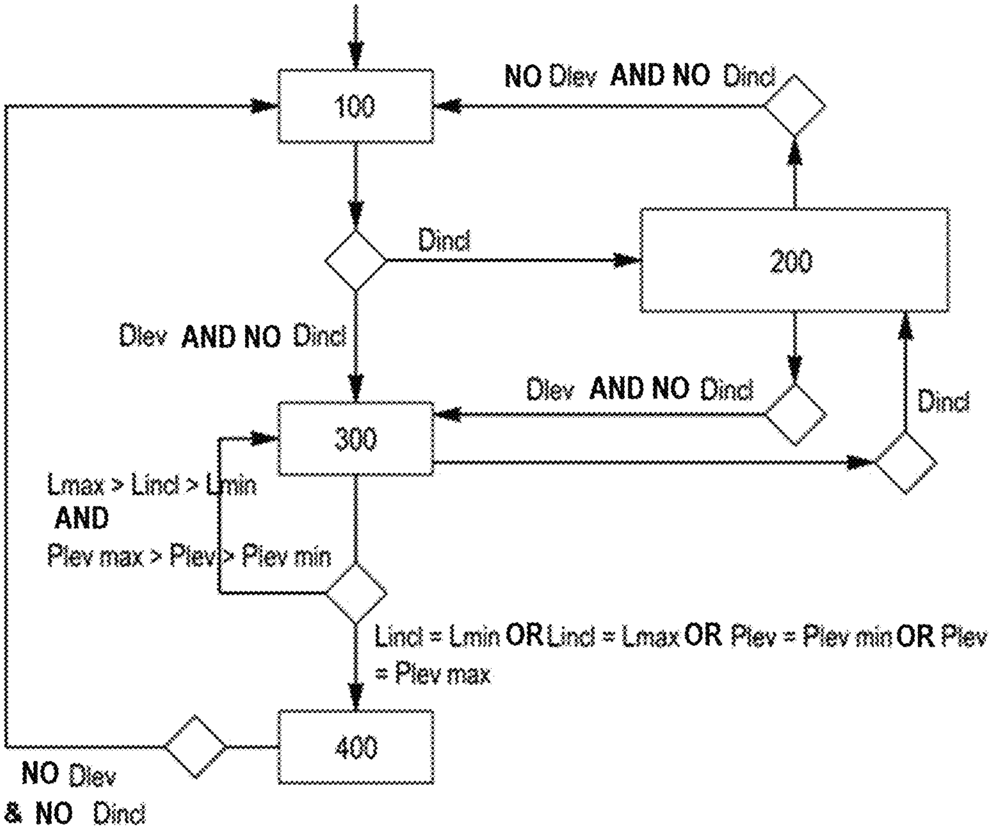
FIG. 3 is a logical diagram of the method for controlling the tilt ram.

With reference to the logical diagram in FIG. 3, a method for controlling the tilt ram 9, notably to implement a compensation mode intended to keep the inclination of the tool 8 constant (or at least substantially constant) in relation to the chassis 2 when the lifting arm 5 is moving, is described.

Step 100 corresponds to a static state of the lifting arm 5 in relation to the chassis 2 and to a static state of the tool 8 in relation to the lifting arm 5, which means that no request $D_{lev}$ to actuate the lifting ram 6 and no request $D_{incl}$ to actuate the tilt ram 9 is sent to the control unit 15. In this state, the compensation function is in the deactivated state. Furthermore, the control unit 15 has a value $L_0$ stored in memory, this value corresponding to the last setpoint value Lc relating to the travel of the tilt ram 9 generated by the control unit 10. The method remains in this step until a request $D_{lev}$ to actuate the lifting ram 6 or a request $D_{incl}$ to actuate the tilt ram 9 is issued.

If a request $D_{incl}$ to actuate the tilt ram 9 is sent by the actuator 16 to the control unit 15 on its own or in combination with a request $D_{lev}$ to actuate the lifting ram 6, the method activates a manual actuation mode of the tilt ram 9 that corresponds to step 200. The control unit 15 generates a setpoint $L_c$ relating to the travel of the tilt ram 9 as a function of the request $D_{incl}$ to actuate the tilt ram 9. The control unit 15 then provides closed-loop control of the travel of the tilt ram 9 as a function of said setpoint $L_c$ relating to the travel of the tilt ram 9 and of the measurement signal S2 relating to the travel $L_{incl}$ of the tilt ram 9 delivered by the sensor 10. The compensation mode, described below, is in the deactivated state and the setpoint value Lc is saved as the value $L_0$ in the memory of the control unit 15. If no more requests to actuate the lifting ram 6 or the tilt ram 9 are issued by the actuator 16 to the control unit 15, the method returns to step 100 corresponding to the static state of the lifting arm 5 and of the tool 8.

If, in step 100, a request $D_{lev}$ to actuate the lifting ram 6 is sent to the control unit 15 without a request $D_{incl}$ to actuate the tilt ram 9 being sent, the compensation mode is activated (step 300). The control unit 15 then generates a displacement setpoint of the lifting ram 6 as a function of the request $D_{lev}$ and controls the lifting ram 6 as a function of the setpoint thus generated.

Furthermore, when the compensation mode is active, the control unit 15 periodically calculates the difference ΔS1 between the two measurement signals S1 relating to the position $P_{lev}$ of the lifting arm 5 delivered by the sensor 7 respectively at the end and at the beginning of the period T in question. Thus, in the embodiment in which the measurement signal S1 delivered by the sensor 7 relates to the tilt angle α of the lifting arm 5, the control unit 15 determines the angular variation Δα corresponding to the displacement of the lifting arm 5 about the axis X1 during the period T in question. In the other embodiment in which the measurement signal S1 relates to the travel $L_{lev}$ of the lifting ram 6, the control unit 15 determines the angular variation Δα as a function of the travel of the lifting ram 6 at the end of the period T in question and of the travel of the lifting ram 6 at the beginning of the period T in question.

The control unit 15 then determines, during the following period T, a new setpoint Lc relating to the length of the tilt ram 9 as a function of the angular variation Δα and of the length $L_0$ that corresponds to the setpoint value Lc relating to the length of the tilt ram 9, stored in memory, during the period T in question. The value $L_0$ is then updated with the new setpoint value Lc relating to the length of the tilt ram 9. The setpoint Lc is for example determined using an equation $Lc=f(\Delta\alpha, L_0)$ or a correlation table that gives a corresponding setpoint value Lc for each pair $L_0$, Δα. The equation or correlation table are such that the angular variation Δβ corresponding to the displacement of the tool 8 about the axis X4 for a change in the travel of the ram between $L_0$ and Lc is the opposite of the angular variation Δα, i.e. has the same absolute value but the opposite direction.

The control unit 15 then provides closed-loop control of the travel of the tilt ram 9 as a function of said setpoint $L_c$ relating to the travel of the tilt ram 9 and of the measurement signal S2 relating to the travel $L_{incl}$ of the tilt ram 9 delivered by the sensor 10. According to an advantageous embodiment, closed-loop control is for example provided using a PID corrector.

To minimize latency time, the period T in question is less than 100 ms. The period T is advantageously greater than 10 ms and is for example in the order of 50 ms.

Furthermore, if a request $D_{incl}$ to actuate the tilt ram 9 is sent by the actuator 16 to the control unit 15 while the compensation mode is activated, the method activates the manual actuation mode of the tilt ram 9, which corresponds to step 200 and which has been described above, thereby deactivating the compensation mode.

Furthermore, if, in step 200, a request $D_{lev}$ to actuate the lifting ram 6 is sent to the control unit 15 without any other request $D_{incl}$ to actuate the tilt ram 9 being sent, the method returns to step 300 in which the compensation mode is in the activated state.

Furthermore, during step 300, the control unit 15 determines whether the tilt ram 9 has reached one of the two stop positions thereof. To do so, the control unit 15 compares the travel $L_{incl}$ of the tilt ram 9 determined using the measurement signal S2 to a threshold length $L_{min}$ and to a threshold length $L_{max}$, and determines that the rod of the tilt ram 9 has reached the fully retracted position thereof if $L_{incl}=L_{min}$ and that the rod of the ram has reached the fully deployed position thereof if $L_{incl}=L_{max}$.

According to one embodiment, during step 300, the control unit 15 can also determine whether the lifting ram 6 has reached one of the two stop positions thereof. To do so, the control unit 15 compares the measurement signal S1 relating to the position $P_{lev}$ of the lifting arm 5 to two thresholds $P_{lev\ min}$ and $P_{lev\ max}$ and determines that the rod of the lifting ram 6 has reached the fully retracted position thereof if $P_{lev}=P_{lev\ min}$ and has reached the fully deployed position thereof if $P_{lev}=P_{lev\ max}$.

If the control unit 15 determines that the tilt ram 9 or that the lifting ram 6 has reached one of the two stop positions thereof, the compensation mode is deactivated (step 400).

During this step 400, the control method returns to step 100 if no more requests to actuate the lifting ram 6 or the tilt ram 9 are issued by the actuator 16 to the control unit 15.

According to one embodiment, if compensation is deactivated, a warning signal is sent to the operator. The warning signal is for example a message that is displayed on the dashboard of the handling machine 1.

Furthermore, according to one advantageous embodiment, when the compensation function is in the activated state, the control unit 15 detects whether the lifting ram 6 is near to one of the two stop positions thereof. To do so, the control unit 15 compares the travel $L_{incl}$ of the tilt ram 9 determined using the measurement signal S2 to a first threshold value $L_1$ and to a second threshold value $L_2$. The first threshold value $L_1$ is greater than $L_{min}$ and defines the upper limit of an approach zone of the retracted position of the tilt ram 9. The second threshold value $L_2$ is less than $L_{max}$ and defines a lower limit of an approach zone of the deployed position of the tilt ram. By way of example, each of said approach zones can correspond to a travel of between 2% and 15%, and for example in the order of 5% to 10% of the total travel of the tilt ram 9, i.e. $L_{max}-L_{min}$.

Furthermore, in response to detection of a position of the tilt ram 9 in one of the two aforementioned approach zones, the control unit 15 is configured to limit the angular velocity of displacement of the lifting arm 5. This is advantageous in that it prevents sudden accelerations of the movement of the lifting arm 5 when the tilt ram 9 reaches one of the stop positions thereof and the hydraulic fluid supply of the lifting ram 6 and of the tilt ram 9 is ensured by a flow distributor 14.

Some of the elements shown, notably the control unit 15, may be provided in different forms, as a single or distributed system, using hardware and/or software components. Usable hardware components include application-specific integrated circuits (ASIC), field programmable logic arrays and microprocessors. The software components may be written in various different programming languages, for example C, C++, Java or VHDL. This list is not exhaustive.

Although the disclosure has been described in relation to several specific embodiments, it is evidently in no way limited thereto and it includes all of the technical equivalents of the means described and the combinations thereof where these fall within the scope of the disclosure, as defined in the claims.

The use of the verbs "comprise", "include" or "have" and the conjugated forms thereof does not exclude the presence of elements or steps other than those listed in a claim.

In the claims, any reference symbol between parentheses must not be interpreted as a limitation on the claim.

The invention claimed is:

1. A method for controlling a handling machine including a chassis,
- a lifting arm mounted pivotingly on the chassis about a first axis between a lowered position and a raised position,
- a lifting ram arranged to pivot the lifting arm about the first axis between the lowered position and the raised position,
- a first sensor configured to deliver a position measurement signal representing a position of the lifting arm between the lowered position and the raised position,
- a tool intended to receive a load and mounted pivotingly on the lifting arm about a second axis parallel to the first axis,
- a tilt ram that has a travel length and is arranged to pivot the tool about the second axis,
- a second sensor configured to deliver a travel measurement signal relating to the travel length of the tilt ram, and
- at least one actuator configured to control the lifting ram and the tilt ram, the method comprising:
- receiving a tilt request from the at least one actuator to actuate the tilt ram,
- in response to receiving the tilt request to actuate the tilt ram,
  - activating a manual actuation mode of the tilt ram, the manual actuation mode of the tilt ram including
    - generating a setpoint relating to travel of the tilt ram based on the tilt request to actuate the tilt ram and
  - providing closed-loop control of the travel length of the tilt ram based on the setpoint and the travel measurement signal,
- receiving a lift request to actuate the lifting ram, and
- in response to receiving the lift request to actuate the lifting ram,
  - activating a compensation mode, the compensation mode including
  - generating the setpoint based on a variation in the position measurement signal, and
    - providing closed-loop control of the travel length based on the setpoint and the travel measurement signal.

2. The method of claim 1,
- wherein the compensation mode involves, for each successive period, determining an angular variation corresponding to an angular displacement of the lifting arm about the first axis during the period, based on two position measurement signals relating to the position of the lifting arm that are delivered respectively at a beginning and at an end of the period, and
- wherein, during a following period, the setpoint is generated based on the angular variation corresponding to a preceding period and the travel length of the tilt ram is closed-loop controlled based on the setpoint.

3. The method of claim 1, wherein the position measurement signal delivered by the first sensor relates to a tilt angle of the lifting arm in relation to a reference axis in a plane orthogonal to the first axis.

4. The method of claim 2, further comprising attributing each generated setpoint relating to the travel of the tilt ram to a variable value and wherein, in the compensation mode, the setpoint is generated based on the angular variation and the variable value.

5. The method of claim 4, wherein
- the angular variation is a first angular variation, and
- in the compensation mode, the setpoint is generated based on the first angular variation and the variable value so that a second angular variation corresponding to an angular displacement of the tool about the second axis for a change in the travel of the tilt ram between the variable value and the setpoint has the same value as the opposite sign to the first angular variation.

6. The method of claim 1, wherein the travel length of the tilt ram is closed-loop controlled by a proportional-integral-derivative (PID) controller.

7. The method of claim 1, wherein the compensation mode is deactivated in response to receiving the tilt request to actuate the tilt ram.

8. The method of claim 1, wherein
- the travel measurement signal is compared to a minimum threshold length and to a maximum threshold length corresponding respectively to a fully retracted position and to a fully deployed position of the tilt ram, and
- the compensation mode is deactivated if the travel length of the tilt ram is equal to one of the minimum threshold length and the maximum threshold length.

9. The method of claim 8, wherein a warning signal is generated if the compensation mode is deactivated.

10. The method of claim 1,
- wherein, in compensation mode, the travel measurement signal is compared to a first threshold value and to a second threshold value, the first threshold value being greater than a minimum threshold length corresponding to a fully retracted position of the tilt ram, the second threshold value being greater than the first threshold value and less than a maximum threshold length corresponding to a fully deployed position of the tilt ram, and
- wherein an angular pivot speed of the lifting arm about the second axis is limited if the travel length of the tilt ram is less than the first threshold value or greater than the second threshold value.

11. A handling machine comprising:
- a chassis;
- a lifting arm mounted pivotingly on the chassis about a first axis between a lowered position and a raised position;
- a lifting ram arranged to pivot the lifting arm about the first axis between the lowered position and the raised position;
- a first sensor that is configured to deliver a position measurement signal representing a position of the lifting arm between the lowered position and the raised position;
- a tool intended to receive a load and mounted pivotingly on the lifting arm about a second axis parallel to the first axis;
- a tilt ram that has a travel length and is arranged to pivot the tool about the second axis;
- a second sensor that is configured to deliver a travel measurement signal relating to the travel of the tilt ram;
- at least one actuator that is configured to deliver a lift request to actuate the lifting ram and a tilt request to actuate the tilt ram; and
- a control unit that is configured to receive the position measurement signal, the travel measurement signal, the lift request and the tilt request, in response to receiving the tilt request to actuate the tilt ram, activate a manual actuation mode of the tilt ram, the manual actuation mode of the tilt ram comprising generating a setpoint relating to travel of the tilt ram based on the tilt request to actuate the tilt ram ram, and providing closed-loop control of the travel length of the tilt ram based on the setpoint and the travel measurement signal, and in response to receiving the lift request to actuate the lifting ram, activate a compensation mode, the compensation mode including generating the setpoint based on a variation in the position measurement signal, and providing closed-loop control of the travel length based on the setpoint and the travel measurement signal.

12. The handling machine claim 11, further comprising a hydraulic control circuit that is configured to control the lifting ram and the tilt ram, and wherein the control unit is configured to control the hydraulic control circuit.

13. The handling machine of claim 12, wherein the hydraulic control circuit includes a tank, a pump and a flow distributor that is configured to bring hydraulic fluid from the pump into communication selectively with at least one of the lifting ram and the tilt ram.

14. The handling machine of claim 11, wherein the control unit is configured to, in compensation mode, for each successive period, determine an angular variation corresponding to an angular displacement of the lifting arm about the first axis during the period, based on two position measurement signals relating to the position of the lifting arm that are delivered respectively at a beginning and at an end of the period, and during a following period, generate the setpoint based on the angular variation corresponding to a preceding period and controlling the travel length of the tilt ram based on the setpoint.

15. The handling machine of claim 14, wherein the control unit is configured to:

attribute each new generated setpoint relating to the travel of the tilt ram to a variable value and to in compensation mode, generate the setpoint relating to the travel of the tilt ram based on the angular variation and the variable value.

16. A handling machine comprising:

a lifting arm pivotably mounted to a chassis;

a lifting ram configured to pivot the lifting arm between a lowered position and a raised position;

a first sensor configured to generate a position measurement signal representing a position of the lifting arm;

a tool pivotably mounted to the lifting arm;

a tilt ram having a travel length and configured to pivot the tool;

a second sensor configured to generate a travel measurement signal related to the travel length;

an actuator configured to generate a lift request to actuate the lifting ram and a tilt request to actuate the tilt ram; and a control unit in communication with the first sensor, the second sensor, and the actuator, and configured to activate a manual actuation mode of the tilt ram in response to the tilt request, the manual actuation mode comprising generating a setpoint related to travel of the tile ram based on the tilt request, and providing closed-loop control of the travel length based on the setpoint and the travel measurement signal, and activate a compensation mode in response to the lift request, the compensation mode including generating the setpoint based on a variation in the position measurement signal over time, and providing closed-loop control of the travel length based on the setpoint and the travel measurement signal.

17. The handling machine of claim 16, further comprising a hydraulic control circuit configured to control the lifting ram and the tilt ram, wherein the control unit is configured to control the hydraulic control circuit.

18. The handling machine of claim 17, wherein the hydraulic control circuit includes a tank, a pump, and a flow distributor configured to bring hydraulic fluid from the pump into communication selectively with at least one of the lifting ram and the tilt ram.

19. The handling machine of claim 16, wherein, in compensation mode, the control unit is configured to, for a plurality of successive periods, during each period, determine an angular variation corresponding to an angular displacement of the lifting arm based on a first position measurement signal generated at a beginning of the period, and a second position measurement signal generated at an end of the period, subsequently, during each period following the end of the preceding period, generate the setpoint based on the angular variation, and control the travel based on the setpoint.

20. The handling machine of claim 19, wherein the control unit is configured to attribute each newly generated setpoint to a variable value, and in compensation mode, generate the setpoint based on the angular variation and the variable value.

* * * * *